Patented Jan. 18, 1949

2,459,440

UNITED STATES PATENT OFFICE 2,459,440

PROCESS OF PRODUCING WAX ESTERS OF HYDROCARBON SULFONATES

Eugene Lieber, West New Brighton, N. Y., and Aloysius F. Cashman, Bayonne, N. J., assignors to Standard Oil Development Company, a corporation of Delaware No Drawing. Application January 1, 1943, Serial No. 471,014

7 Claims. (Cl. 260—456)

This invention relates to a new type of lubricating oil additive and methods of preparing same, and more particularly to organic condensation products containing sulfur and having both extreme pressure lubricating properties and also pour-depressing properties.

Broadly, the invention comprises reacting thiourea with halogenated organic compounds and using the resulting reaction product per se or converting them by further reaction into various other derivatives.

Thiourea which is one of the primary reactants of this invention has the graphic formula

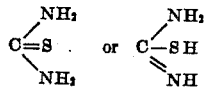

Instead of using this exact compound, one may use various derivatives thereof, such as those in which one or more, but not more than 3, of the amino hydrogen atoms is replaced by an organic radical, especially a hydrocarbon group such as an alkyl group, e. g., methyl, ethyl, isopropyl, n-butyl, tertiary butyl, etc., or an aryl group such as phenyl, naphthyl, or mixed alkyl-aryl groups, such as tolyl, amyl-phenyl, benzyl, etc.

The other primary reactant of this invention is a halogenated organic compound which may be represented broadly by the general formula R—X, where R is an aliphatic hydrocarbon group, e. g., one derived from a relatively pure hydrocarbon compound, such as pentane, butane, octane, decane, cetane, octadecane, etc., or one derived from hydrocarbon mixtures, such as petroleum hydrocarbons, e. g., paraffin wax, kerosene, naphtha, lubricating oil, etc., or an organic compound containing an aliphatic hydrocarbon group, e. g., benzyl, naphthenyl, phenyl, octadecyl, etc., or groups derived from other types of aliphatic organic materials, such as natural fatty substances, e. g., beef fat, mutton tallow, non-drying vegetable oil, etc., and X represents one or more halogen atoms attached to R through aliphatic carbon atoms.

The reaction of the two primary reactants of this invention, e. g., a thiourea with the halogenated aliphatic compound, may be represented in a general way by the following equation in which, for the sake of simple illustration, thiourea is used per se and the formula R—Cl represents a chlorinated aliphatic hydrocarbon:

H$_2$N—C(S)—NH$_2$+R—Cl→

[H$_2$N—C(SR)=NH]HCl

In carrying out this reaction, the halogenated aliphatic material, such as chlorinated paraffin wax, and the thiourea are refluxed in a solvent which may be of several types of which the alcohols, e. g., butyl alcohol, are preferred. If chlorinated wax is used, the reaction product may be considered to have the graphic formula:

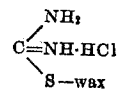

These primary reaction products may be blended into lubricating oil as such, or preferably the hydrochloride radical is displaced by a suitable organic radical, such as an organic acid, e. g., acetic acid, petroleum naphthenic acid, or stearic acid, etc., in which latter case the product may be considered as having the graphic formula

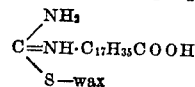

Another object of this invention is to convert the above-described primary reaction product or the slight modifications thereof into secondary reaction products by one or more further chemical reactions involving the removal of the carbamido group —C(=NH)—NH$_2$.

For example, if the primary reaction product is treated by saponification with alkalies or acids, the urea part of the compound is removed and a mercapto group is introduced, as illustrated by the following general equation, in which a primary reaction product derived from chlorinated paraffin wax is used:

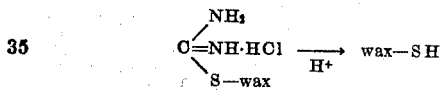

The resulting product which may be termed "a wax mercaptan" may be used as such as a lubricating oil additive to impart extreme pressure and film strength improving properties to the oil. Also, if desired, by using in the primary reaction, less thiourea than required to react with all of the chlorine in the chlorinated wax, corresponding products containing both chlorine and sulfur may be obtained, as may be represented by the general formula:

in which R represents the organic radical containing the aliphatic hydrocarbon group of the primary halogenated aliphatic organic compound used. For instance, if chlorinated wax is used, the corresponding chlorinated wax mercaptan would be represented by the general formula

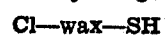

in which, of course, the Cl does not necessarily represent a single chlorine atom per molecule, but merely represents that the wax mercaptan contains some chlorine.

Such chloro wax mercapto derivatives per se are potent extreme pressure agents which are quite stable under conditions of high temperature, but may, if desired, be readily converted to corresponding metal derivatives such as those of barium, calcium, magnesium, aluminum, nickel, etc., which may be represented by the general formula:

$$(Wax-S-)_v M$$

in which M represents a metal and $v$ represents the valence of the metal M; the specific formula in the case of the barium derivative would be:

$$Wax-S-Ba-S-wax$$

As mentioned above, by controlling the proportions of primary reactants in order to leave some chlorine in the resulting products, a final product starting from chlorinated wax and converted into the barium derivative, would have the general formula $$Cl-wax-S-Ba-S-wax-Cl$$

Such materials, which may be called "chloro wax mercaptides" (of whatever metal was used), may, by treatment with $Na_2S$ or similar materials, according to the following reaction:

$$Cl-wax-S-Ba-S-wax\underbrace{-Cl + Na}-S-\underbrace{-Na + Cl}-wax-S-Ba-S-wax-Cl \longrightarrow$$
$$Cl-wax-S-Ba-S-wax-S-wax-S-Ba-S-wax-Cl$$

be converted into polymer type metallosulfur derivatives which might be illustrated by the formula:

$$\ldots Wax-S-Ba-S-wax-S-wax-S-$$
$$Ba-S-wax-S-wax-S-Ba-S-wax \ldots$$

These metallosulfur wax derivatives are good additives for lubricating oils, imparting thereto detergent, anti-oxidant, load-carrying, etc., properties.

Another major chemical conversion to which the primary reaction products of this invention may be subjected involves their treatment with water and halogen in order to product sulfonyl halides, according to the general equation $$\underset{S-R}{\overset{NH_2}{C=NH}} \cdot HCl \xrightarrow[H_2O]{X} R-SO_2X$$

These organic sulfonyl halides may be represented by the generic formula $$(Y)_n-R-(SO_2X)_m$$

where R is a derived organic radical, such as a hydrocarbon radical derived from paraffin wax, kerosene, or other petroleum fraction or other hydrocarbon radical; Y is a substituent radical, e. g., halogen, nitro, carboxyl, carbalkoxyl, ether-amino, amido, hydroxy, keto, etc.; X is a halogen (preferably) chlorine; and $m$ and $n$ are integers which may be one or more. As a specific example, a wax sulfonyl chloride, derived from chlorinated paraffin wax and thiourea as primary reactants and subsequent treatment with water and chlorine, will have the general formula:

$$Wax-SO_2-Cl$$

These derivatives per se are valuable lube oil additives, being capable of depressing the pour point of a waxy lube oil while at the same time increasing the load carrying capacity thereof, as will be shown by experimental data in one of the examples hereinbelow.

By proper adjustment of the chlorine content of the original chlorinated paraffin wax, and/or the amount of chlorination in the secondary conversion reaction, the corresponding chlorinated derivatives of such sulfonyl chlorides may be obtained, as for instance, chloro wax sulfonyl chloride which may be represented by the general formula:

$$Cl-wax-SO_2Cl$$

Such products are not only powerful pour depressors but also are good extreme pressure additives which are stable under conditions of high temperature use.

In case it is desired to replace the halogen atom of the sulfonyl halide radical, the sulfonyl halide may be converted into other derivatives by a variety of chemical reactions of which a number ($a$, $b$, $c$, $d$, $e$, $f$) are suggested herewith, using for the sake of illustration the wax sulfonyl chloride as the substance to be converted into the various corresponding derivatives:

(a) Reaction with aromatic compounds in the presence of suitable catalysts:

$$Wax-SO_2-Cl + Ar \xrightarrow{AlCl_3} wax-SO_2-Ar$$

Specifically in the case of naphthalene as the aromatic compound, the final conversion product would be represented by the general formula:

$$Wax-SO_2-C_{10}H_7$$

(b) Reaction with hydroxy, e. g., alcohol, and/or phenolic materials to form esters as illustrated by the equations $$Wax-SO_2-Cl + C_{17}H_{33}OH \text{ (oleyl alcohol)} \rightarrow$$
$$wax-SO_2-OC_{17}H_{33}$$
$$Wax-SO_2-Cl + HOC_6H_5 \rightarrow wax-SO_2-O-C_6H_5$$

(c) Reaction with mercapto-containing material, as illustrated by the following equation, in which the wax sulfonyl chloride is reacted with a wax mercaptan, such as previously discussed above.

$$Wax-SO_2Cl + wax-SH \rightarrow wax-SO_2-S-wax$$

(d) Reaction with metallosulfur compounds, such as thiocyanates, xanthates, thiocarbonates, thiocarbamates, and related materials, as illustrated by the following equation:

$$Wax-SO_2Cl + ROCSSNa \rightarrow wax-SO_2-SSCOR$$

(e) Reaction with ammonia, amines, and other nitrogen derivatives, as illustrated by the following reaction with aniline:

$$Wax-SO_2-Cl + H_2N-C_6H_5 \rightarrow$$
$$wax-SO_2-NH-C_6H_5$$

(f) Conversion to metalloderivatives as illustrated by the following equation:

$$Wax-SO_2-Cl + BaO \rightarrow$$
$$wax-SO_2-Ba-SO_2-wax$$

It will be apparent to those skilled in the art that many other variations can be made which come within the broader scope of the invention.

The objects, advantages, and details of the invention will be better understood from a consideration of the following specific examples.

Example 1

244 grams of chloro-wax (prepared from 146° M. P. wax and containing 15% chlorine) and 76 grams of thiourea were suspended in 250 cc. of secondary butyl alcohol as solvent. The mixture was refluxed under a return condenser for 21 hours and the solvent then removed by distillation under high vacuum. The residue, which is the primary reaction product, was suspended in 1,500 cc. of $H_2O$, and while maintaining vigorous mechanical agitation, chlorine gas was bubbled into the suspension until no further chlorine was absorbed. During the treatment with chlorine the temperature was kept below 125° F. The resulting "wax sulfonyl chloride" separated from the suspension and was washed several times by decantation. The product was taken up in ether and then washed free of HCl. After drying the ether solution, the solvent was removed by distillation. A yield of 231 grams of a product having a brown crystalline appearance was obtained. On analysis it was found to contain 4.6% sulfur and 12.4% chlorine.

When 5% of this wax sulfonyl chloride, prepared as described above, was blended in a waxy oil having a pour point of +30° F., the pour point was reduced to 0° F. When 10% of this product was blended in the same oil, a pour point of −5° F. was obtained.

When 10% of this wax sulfonyl chloride, prepared as described above, was blended in a Panhandle Bright Stock and tested for extreme pressure properties on the S. A. E. testing machine, a value of 247 was obtained. When the Panhandle Bright Stock itself was tested on the S. A. E. machine, a value of 50 was obtained. The values obtained represent a considerable improvement over the oil per se in extreme pressure properties. Thus it is apparent that this wax sulfonyl chloride has both pour-depressing and extreme pressure lubricating properties, and therefore is a valuable additive for mineral lubricating oils.

Example 2

250 grams of a chlorinated kerosene containing 17.3% Cl and 85 grams of thiourea were refluxed in 250 cc. of secondary butyl alcohol for 21 hours. The solvent was then removed by distillation under high vacuum and the residue, which is the primary reaction product of the thiourea and chlorinated kerosene, so obtained suspended in 1,500 cc. of $H_2O$. Chlorine gas was passed through the suspension until no further quantity was adsorbed. The resulting kerosene sulfonyl chloride separated out as a yellow oil. This was taken up in benzol and after washing free of acid the benzene was removed by distillation. This also effected a drying of the product. A yield of 209 grams of a dark brown oil, which consisted essentially of kerosene sulfonyl chloride, was obtained as product. This showed the following analysis:

%S = 2.9
%Cl = 17.3

When 10% of this kerosene sulfonyl chloride was added to a blend comprising 39 parts of a light lubricating oil base stock and 61 parts of a heavy paraffinic base lubricating oil, an S. A. E. rating of 209 was obtained. When the oil itself was tested on the S. A. E. machine, a value of 50 was obtained.

Example 3

25 grams of our wax sulfonyl chloride, prepared as described in Example 1, was heated for 15 minutes with vigorous stirring with an excess of aqueous NaOH (25%). After cooling, the mixture was taken up in benzol and washed, the benzol and last traces of water being removed by azeotropic distillation. A yield of 30 grams of a wax-like sodium wax sulfonate was obtained as product.

When 2.5% of this sodium wax sulfonate was blended in a waxy oil having a pour point of +30° F., a pour point of −5° F. was obtained. When 5% of the sodium wax sulfonate was blended in the same oil, a pour point of −10° F. was obtained.

Example 4

15 grams of the sodium wax sulfonate prepared as described in Example 3, was suspended in benzene and refluxed with 12 grams of chloro wax (made from 146° M. P. wax and containing 15% Cl) for four hours. NaCl precipitated from the reaction mixture. After removal of the benzol, a wax-like product was obtained which is the wax ester of wax sulfonate formed by the following reaction:

Wax—Cl + $NaSO_3$wax → wax—$SO_3$—wax

When 2.5% of this wax ester of wax sulfonate was blended in a waxy oil, having a pour point of +30° F., a pour point of −15° F. was obtained.

Example 5

25 grams of wax sulfonyl chloride, prepared as described in Example 1, was heated for 30 minutes with an excess of concentrated ammonia water. A rigid creamy emulsion formed which was taken up in benzol and the water removed by azeotropic distillation. Finally, the last traces of benzol were removed by high vacuum distillation. A wax-like product was obtained which may be termed a "wax sulfonamide."

Wax—$SO_2$—$NH_2$

When 10% of this wax sulfonamide was blended in a waxy oil having a pour point of +30° F., a pour point of 0° F. was obtained.

Example 6

25 grams of wax sulfonyl chloride, prepared as described in Example 1, were heated for 15 minutes with vigorous stirring with 50 grams of aniline. The reaction product was taken up in benzol, and after washing the water was removed by azeotropic distillation. The last traces of solvent were removed by high vacuum distillation. A product having the approximate structure

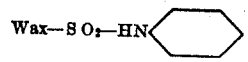

was obtained. This may be termed a "wax-sulfon-anilide."

When 5% of this wax-sulfon-anilide was blended in a waxy oil having a pour point of +30° F., a pour point of 0° F. was obtained.

Example 7

25 grams of wax-sulfonyl-chloride, prepared as described in Example 1 were heated for 15 minutes with 50 grams of pyridine. The reaction product was taken up in benzol, and after washing the water was removed by azeotropic distillation. A product having the approximate structure:

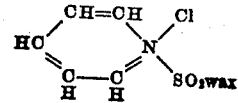

was obtained. This may be termed a "wax-sulfon-pyridinonium chloride."

When 10% of this wax-sulfon-pyridinonium chloride was blended in a waxy oil having a pour point of +30° F., a pour point of −10° F. was obtained.

While it has been designated that the various derivatives of wax sulfonyl chloride have a monomeric structure, it should be kept in mind that these products effectively may be polymeric in structure.

It is thus apparent that the present invention opens up vast new fields for the chemical manufacture of valuable lubricating oil additives by making possible the production of additives having pour-depressing properties as well as other properties, such as extreme pressure lubricating characteristics, anti-oxidant properties, detergent characteristics, etc.

It is not intended that this invention be limited to the specific examples which have been given merely for the sake of illustration, nor unnecessarily by any theories which have been suggested as to the mechanism of the operation of the invention, but only by the appended claims in which it is intended to claim all novelty inherent in the invention as well as all modifications coming within the scope and spirit of the invention.

We claim:

1. The process which comprises reacting a thiourea with a halogenated organic compound having the general formula $RX_n$ in which R is a hydrocarbon radical of at least 8 carbon atoms and containing an aliphatic group, X represents halogen connected to R by linkage to aliphatic carbon and $n$ represents the number of halogen atoms, converting the resulting pseudo-thiourea product by means of water and halogen into the corresponding sulfonyl halide, treating the latter with a basic metal neutralizing agent to form the corresponding metal sulfonate derivative, and finally condensing the latter with chlorinated petroleum wax to produce an oil-soluble wax ester of a hydrocarbon sulfonate.

2. Process according to claim 1 in which $RX_n$ is a chlorinated paraffin wax made from a paraffin wax having a melting point of about 146° F. and containing about 15% of chlorine, and only enough thiourea is used to make a resulting pseudothiourea compound which, after treatment with chlorine and water will produce a wax sulfonyl chloride containing about 4.6% sulfur and about 12.4% of chlorine.

3. The process of preparing oil-soluble wax esters of hydrocarbon wax sulfonates having wax modifying properties which comprises chlorinating a paraffin wax having a melting point of about 146° F. to about 15% chlorine content, reacting the resultant chlorinated wax with thiourea under reaction conditions substantially equivalent to the use of 76 parts by weight of thiourea to 244 parts by weight of chlorinated wax and refluxing the mixture in secondary butyl alcohol for about 21 hours, removing the solvent by vacuum distillation, suspending the resultant pseudothiourea product in water and treating the mixture with chlorine gas at a temperature below about 125° F. until no further chlorine is absorbed, separating a wax sulfonyl chloride as a brown crystalline solid, containing about 4.6% sulfur and about 12.4% chlorine, heating said wax sulfonyl chloride with an excess of aqueous caustic soda of about 25% concentration to form a sodium wax sulfonate soluble in waxy mineral lubricating oils and having the property of depressing the pour point thereof when added thereto in small concentrations, separating said sodium wax sulfonate from the aqueous caustic soda solution and finally condensing it with a chlorinated wax made from a paraffin wax having a melting point of about 146° F. and containing about 15% chlorine, whereby the sodium is removed from said sodium wax sulfonate and there is produced a paraffin wax ester of a wax sulfonate, which ester is soluble in waxy mineral lubricating oils and has better pour depressing properties than either of the intermediately formed wax sulfonyl chloride or the sodium wax sulfonate.

4. The process of making wax esters which comprises reacting a chlorinated paraffin wax with a metal hydrocarbon sulfonate, and separating the resultant metal chloride salt to leave a wax ester of the hydrocarbon sulfonate.

5. The process of making wax esters which comprises reacting a hydrocarbon sulfonyl halide with a basic metal neutralizing agent to make the corresponding metal hydrocarbon sulfonate derivative, and condensing the latter with a chlorinated paraffin wax to produce an oil-soluble wax ester of the hydrocarbon sulfonate, and separating the resultant metal chloride salt from said ester.

6. The process of producing a paraffin wax ester of a paraffin wax sulfonate which comprises reacting a paraffin wax sulfonyl chloride with caustic soda to make a sodium wax sulfonate and then heating the latter with chlorinated paraffin wax, and separating precipitated sodium chloride from the resultant wax ester of wax sulfonate.

7. Process according to claim 6 in which the paraffin wax sulfonyl chloride used as raw material is made from a paraffin wax of at least 146° F. melting point.

EUGENE LIEBER.
ALOYSIUS F. CASHMAN.

REFERENCES CITED

The following references are of record in the file of this patent:

UNITED STATES PATENTS

| Number | Name | Date |
|---|---|---|
| Re. 20,968 | Reed | Jan. 3, 1939 |
| 2,142,934 | Bruson et al. | Jan. 3, 1939 |
| 2,146,744 | Johnson | Feb. 14, 1939 |
| 2,147,346 | Johnson | Feb. 14, 1939 |
| 2,149,788 | Orr | Mar. 7, 1939 |
| 2,174,507 | Tinker et al. | Sept. 26, 1939 |
| 2,174,508 | Fox | Sept. 26, 1939 |
| 2,174,856 | Johnson | Oct. 3, 1939 |
| 2,193,824 | Lockwood et al. | Mar. 19, 1940 |
| 2,197,800 | Henke et al. | Apr. 23, 1940 |
| 2,219,164 | Moser | Oct. 22, 1940 |
| 2,220,970 | Loane | Nov. 12, 1940 |
| 2,238,790 | Davis | Apr. 15, 1941 |
| 2,263,312 | Reed | Nov. 18, 1941 |
| 2,278,164 | De Groote | Mar. 31, 1942 |
| 2,341,565 | Lyman et al. | Feb. 15, 1944 |

OTHER REFERENCES

Beilstein: "Handbuch der Org. Chem.," 4th ed., supplemental vol. III/IV, page 77, ibid., vol. III, pages 182–184.